(12) United States Patent
Muto et al.

(10) Patent No.: US 6,564,822 B2
(45) Date of Patent: May 20, 2003

(54) FUEL CUTOFF APPARATUS

(75) Inventors: Nobuharu Muto, Sashima-gun (JP); Norikazu Sugimura, Sashima-gun (JP)

(73) Assignee: Kyosan Denki Co., Ltd., Sashima-Gun (JP)

( * ) Notice: Subject to any disclaimer, the term of this patent is extended or adjusted under 35 U.S.C. 154(b) by 0 days.

(21) Appl. No.: 09/971,595

(22) Filed: Oct. 9, 2001

(65) Prior Publication Data
US 2002/0040730 A1 Apr. 11, 2002

(30) Foreign Application Priority Data
Oct. 10, 2000 (JP) ........................................ 2000-309460

(51) Int. Cl.[7] ............................................... F16K 24/04
(52) U.S. Cl. ........................................ 137/202; 137/43
(58) Field of Search .................................... 137/43, 202

(56) References Cited

U.S. PATENT DOCUMENTS

| | | | | |
|---|---|---|---|---|
| 4,655,238 A | * | 4/1987 | Szlaga | 137/43 |
| 5,449,029 A | * | 9/1995 | Harris | 137/202 |
| 5,529,086 A | * | 6/1996 | Kasugai et al. | 137/202 |
| 5,535,772 A | * | 7/1996 | Roetker et al. | 137/202 |
| 5,568,823 A | * | 10/1996 | Tateishi | 137/202 |
| 5,577,526 A | * | 11/1996 | Kasugai et al. | 137/202 |
| 5,694,968 A | * | 12/1997 | Devall et al. | 137/202 |
| 5,832,950 A | * | 11/1998 | Shimada et al. | 137/202 |
| 5,960,816 A | * | 10/1999 | Mills et al. | 137/202 |
| 6,016,827 A | * | 1/2000 | Dawson | 137/202 |

FOREIGN PATENT DOCUMENTS

JP        A-10-238429        9/1998

* cited by examiner

Primary Examiner—Gerald A. Michalsky
(74) Attorney, Agent, or Firm—Oliff & Berridge, PLC

(57) ABSTRACT

A fuel cutoff apparatus is provided with an outer casing and an inner float disposed inside the outer casing so as to be vertically movable therein. A plurality of openings are provided in a side face of the outer casing. A valve opening is provided at a top portion of the outer casing and a valve body is provided at a top portion of the inner float. There is also provided a plate that closes a bottom surface of the outer casing and an exhaust port for exhausting fuel provided in the plate closed by a valve protrusion provided on a bottom portion of the inner float.

18 Claims, 16 Drawing Sheets

RELATED ART

RELATED ART

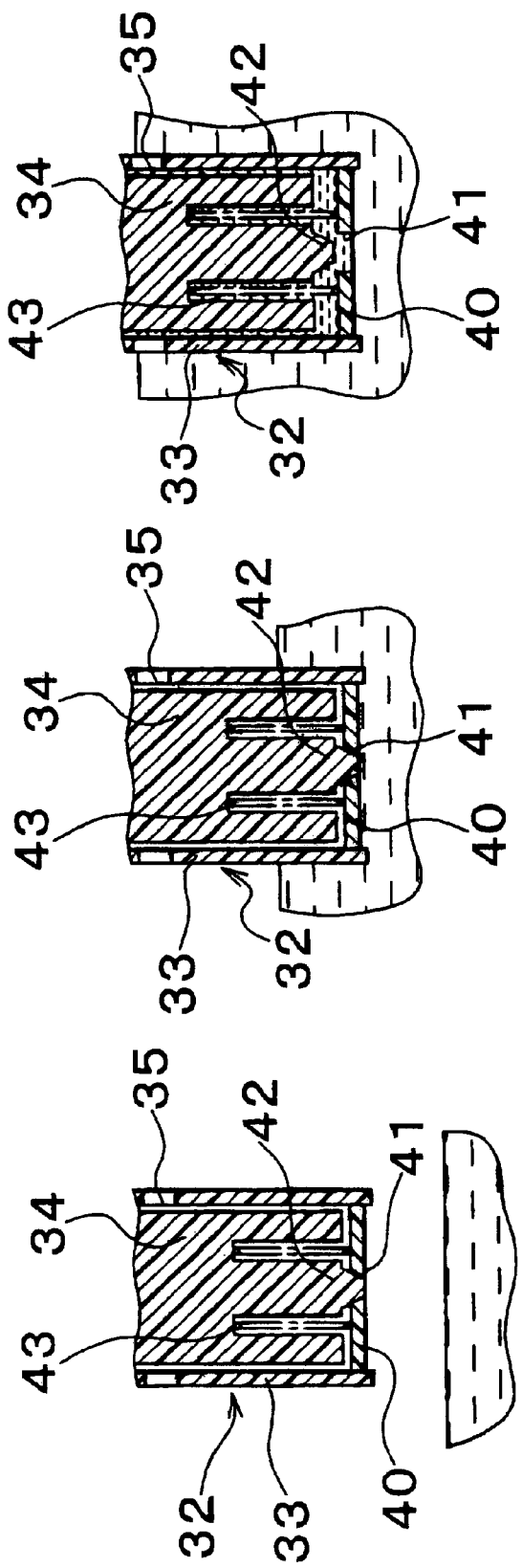

FUEL CUTOFF APPARATUS

INCORPORATION BY REFERENCE

The disclosure of Japanese Patent Application No. 2000-309460 filed on Oct. 10, 2000 including the specification, drawings and abstract is incorporated herein by reference in its entirety.

BACKGROUND OF THE INVENTION

1. Field of the Invention

The invention relates to a fuel cutoff apparatus mounted in a fuel tank. More particularly, it relates to a float valve apparatus that cuts off communication to a canister to prevent fuel from being sent to the canister when the fuel tank is full.

2. Description of the Related Art

A fuel tank in an automobile is provided with an air intake/exhaust system to allow an amount of air corresponding to a varying amount of fuel in the fuel tank to get in and out of the fuel tank.

In an ordinary air intake/exhaust system, an inside of the fuel tank is connected to the air intake system via a canister and, if a large amount of fuel is fed toward the canister with the fuel tank full of fuel, the canister becomes wet and inoperative. A fuel cutoff apparatus is therefore installed at an upper portion of the fuel tank, functioning to prevent a large amount of fuel vapor from being sent toward the canister when the fuel tank is full.

Japanese Patent Application Laid-Open Publication No. HEI 10-238429, for example, discloses a fuel cutoff apparatus disposed at an upper portion of a fuel tank as a related art to the invention.

The fuel cutoff apparatus disposed at the upper portion of the fuel tank as a related art to the invention will be described with reference to FIG. 1.

There is provided a fuel cutoff apparatus 2 at an upper portion of a fuel tank 1. The fuel cutoff apparatus 2 is of dual construction. A plurality of openings 4 that allow fuel to flow in are provided in a side face of an outer casing 3. In addition, there are provided valve openings 5A, 5B at a top portion of the outer casing 3. The outer casing 3 is secured to a mounting casing 6 which is, in turn, secured to the fuel tank 1. The mounting casing 6 is provided with a port 7 that communicates with a side of the canister (not shown).

An inner float 8 is provided so as to be vertically movable inside the outer casing 3. Valve bodies 9A, 9B that open and close the valve openings 5A, 5B are provided at a top of the inner float 8.

There is provided an exhaust port 10 for exhausting that part of fuel that flows into the outer casing 3 at a bottom end of the outer casing 3 and a hollow valve 11 for opening and closing the exhaust port 10 is also provided. The hollow valve 11 keeps the exhaust port 10 open when the fuel level remains low, but, as the fuel level becomes high, the hollow valve 11 floats up through buoyancy to close the exhaust port 10.

The operation of the fuel cutoff apparatus constructed as described in the foregoing will be explained.

When a fuel level L is low, the inner float 8 is located at a level downward the outer casing 3, which keeps the valve openings 5A, 5B open. The hollow valve 11 is located downward to keep the exhaust port 10 open.

When the fuel level L becomes equivalent to, or higher than, the level of the hollow valve 11, the hollow valve 11 goes up to close the exhaust port 10.

When the fuel level L becomes higher than the level of the openings 4, fuel flows into the outer casing 3 through the openings 4. Since the exhaust port 10 is closed, the fuel that has flown in is stored inside the outer casing 3.

This results in the inner float 8 being raised through buoyancy. At this time, however, the valve body 9B closes only the valve opening 5B and the inner float 8 is yet to close the valve opening 5A. As a result, the fuel level goes even further upward.

When the fuel level goes even further upward, the inner float 8 goes even further upward, in which condition the valve opening 5A is closed by the valve body 9A.

According to the known fuel cutoff apparatus, therefore, fuel can be prevented from being cut off at early stages and, at the same time, the fuel tank can be filled with more fuel to a higher level thereof.

The know fuel cutoff apparatus nonetheless presents the following problems.

Since the hollow valve 11 is provided separately from the inner float 8, the number of parts used increases resulting in an increased cost. The increase in the number of parts used is also disadvantageous in terms of production control.

Referring to FIG. 2, when a fuel cutoff apparatus 21 is mounted on a fuel tank 22, a flow F of fuel sent through a fuel filler pipe 23 makes direct contact with an opening 24 provided in a side of the fuel cutoff apparatus 21. This causes an inner float of the fuel cutoff apparatus 21 to be actuated at early stages, which stops an automatic fuel supplying operation by a filler gun before the fuel tank becomes full, thus requiring additional fuel filling.

SUMMARY OF THE INVENTION

It is therefore an object of the invention to provide a fuel cutoff apparatus that prevents an inner float from being actuated at early stages and, at the same time, allows a fuel tank to be topped up regardless of the position at which a fuel filler pipe is mounted.

To achieve the foregoing object, the invention adopts the following embodiments.

A fuel cutoff apparatus according to a first aspect of the invention is provided with an outer casing that is provided with a plurality of openings in a side face thereof and a valve opening in a top thereof, a plate that is provided so as to close a bottom opening of the outer casing and provided with an exhaust port for exhausting fuel, and an inner float that is disposed so as to be vertically movable in an inside of the outer casing and provided with a valve body to open and close the valve opening on a top thereof and a closing portion to close the exhaust port on a bottom thereof.

A fuel cutoff apparatus according to a second aspect of the invention is provided with an outer casing that is provided with a plurality of openings in a side face thereof and a valve opening in a top thereof, an inner float that is provided with a valve body to open and close the valve opening on a top thereof and disposed so as to be vertically movable in an inside of the outer casing, and a cover that covers the openings in the outer casing.

A fuel cutoff apparatus according to a third aspect of the invention is provided with an outer casing and an inner float that is disposed so as to be vertically movable inside the outer casing. The outer casing is provided with a plurality of openings in a side face thereof, an upper hole in an upper portion of the side face thereof, and a valve opening in an upper portion thereof. In addition, a portion formed in a manner to open outwardly is provided at a position lower than the upper hole portion of the outer casing. A valve body that opens and closes the valve opening in the outer casing is provided at an upper portion of the inner float. There is also provided a cover that covers the openings portion in the outer casing.

A fuel cutoff apparatus according to a fourth aspect of the invention is provided with an outer casing and an inner float that is disposed so as to be vertically movable inside the outer casing. The outer casing is provided with a plurality of openings in a side face thereof. There is provided an upper hole in an upper portion of the side face of the outer casing and there is a valve opening in a top of the outer casing. There is also provided at an upper portion of the inner float a valve body that opens and closes the valve opening in the outer casing. In addition, the fuel cutoff apparatus according to the fourth aspect of the invention is provided a cover that covers the upper hole portion of the outer casing and the openings portion of the outer casing. Moreover, there is provided in an intermediary portion of the cover between the upper hole portion and the openings a slope surface of a recessed portion formed by narrowing the diameter. There is also at a top end of the cover a portion with a diameter larger than a main body of the cover formed in a manner to open outwardly.

A fuel cutoff apparatus according to a fifth aspect of the invention is provided with an outer casing and an inner float that is disposed so as to be vertically movable inside the outer casing. The outer casing is provided with a plurality of openings in a side face thereof. There is provided an upper hole in an upper portion of the side face of the outer casing and there is a valve opening in a top of the outer casing. There is also provided at an upper portion of the inner float a valve body that opens and closes the valve opening in the outer casing. In addition, the fuel cutoff apparatus according to the fifth aspect of the invention is provided a first cover of a shape of a skirt that covers the upper hole portion of the outer casing and a second cover that covers the openings portion of the outer casing.

A fuel cutoff apparatus according to a sixth aspect of the invention is provided with an outer casing and an inner float that is disposed so as to be vertically movable inside the outer casing. A valve opening is provided on a top of the outer casing. There is provided at a top of the inner float a valve body that opens and closes the valve opening in the outer casing. The outer casing is of a multiple-diameter structure. An opening comprising a vertical hole is provided at a portion with an enlarging diameter. In addition, an upper hole comprising a vertical hole is provided at another portion with an enlarging diameter located higher than the portion with an enlarging diameter having the opening therein.

The following effects can be derived from the invention described in the foregoing discussion.

According to each of the aspects of the invention, the fuel cutoff apparatus can be prevented from being actuated at early stages. In addition, the number of parts used can be decreased for the reduced cost as well as the enhanced ease of assembly. The degree of freedom in installation of the fuel cutoff apparatus can also be enhanced because of the connection with the mounting position of the filler pipe.

BRIEF DESCRIPTION OF THE DRAWINGS

FIGS. 4A, 4B, and 4C are cross-sectional views for illustrating the operation of the fuel cutoff apparatus according to the invention during an ordinary fuel filling.

DETAILED DESCRIPTION OF THE PREFERRED EMBODIMENTS

The embodiments of the invention will be explained in details with reference to the attached drawings.

Figure 1:
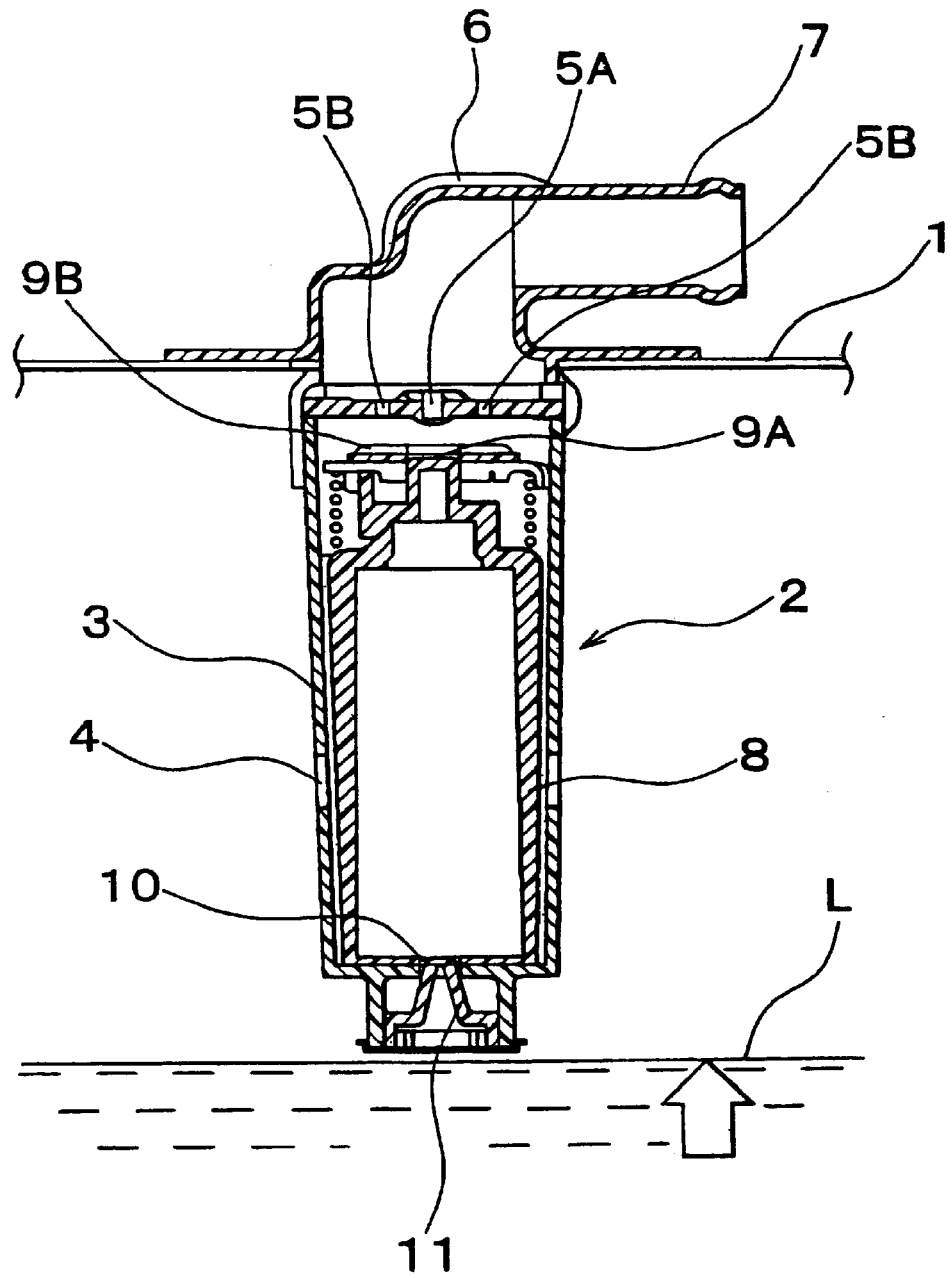
FIG. 1 is a cross-sectional view showing a typical fuel cutoff apparatus of the related art.
Figure 2:
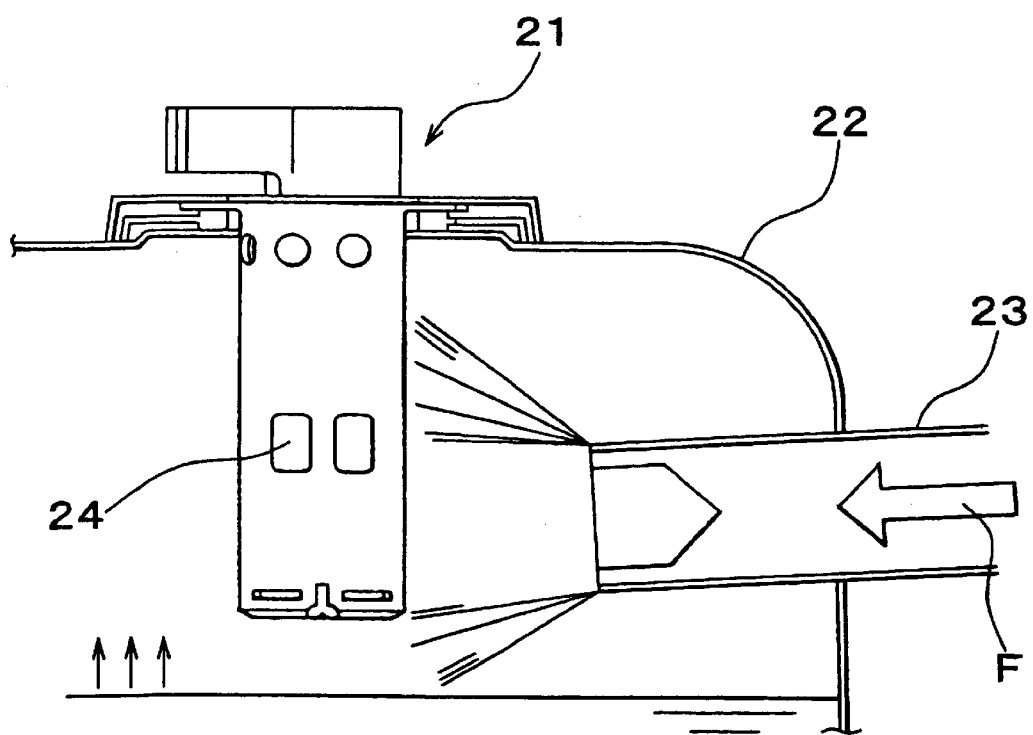
FIG. 2 is a schematic illustration showing the mounting position of the typical fuel cutoff apparatus of the related art with reference to the mounting position of a filler pipe.
Figure 3:
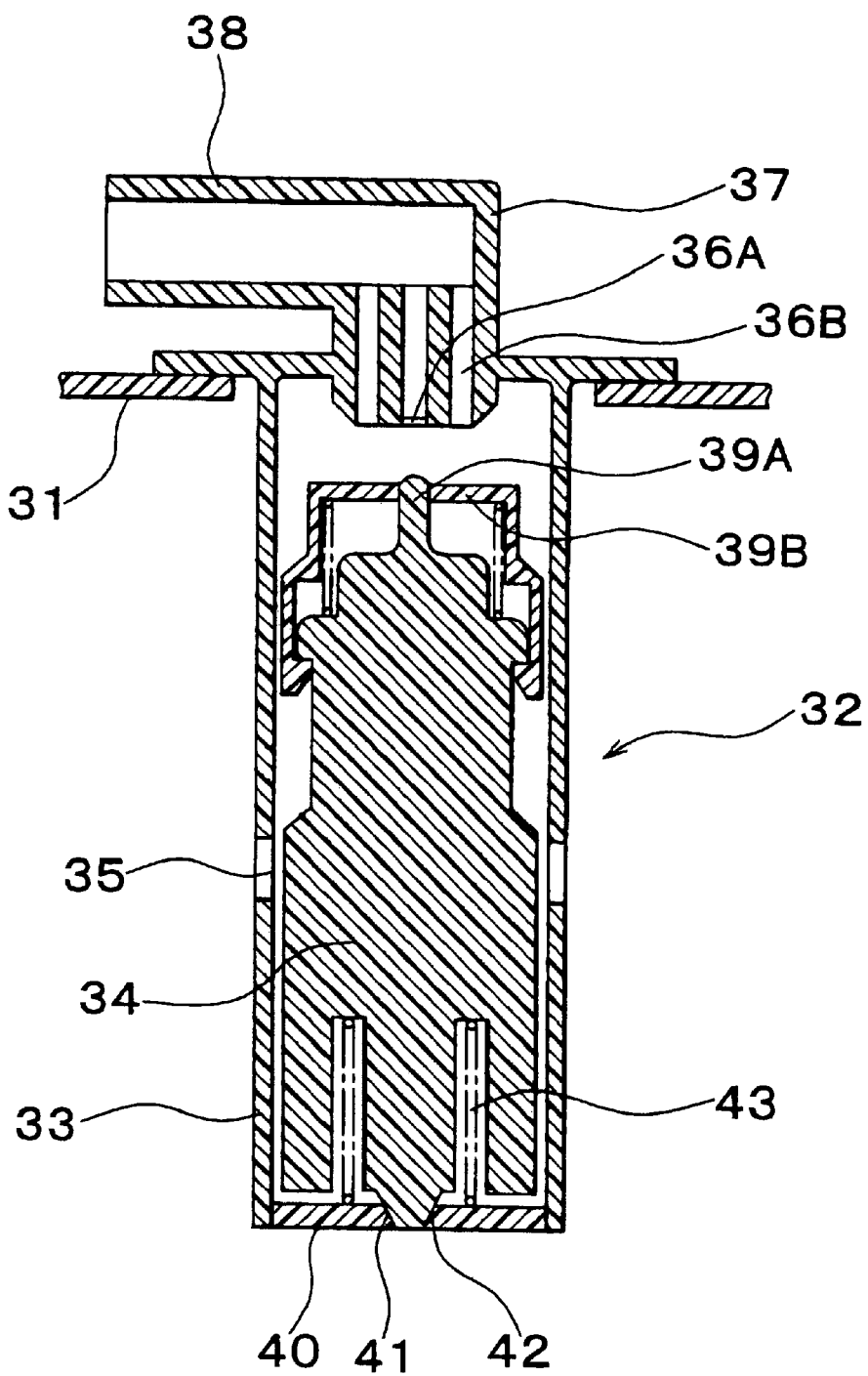
FIG. 3 is a cross-sectional view showing a fuel cutoff apparatus according to one preferred embodiment of the invention.

A fuel cutoff apparatus according to one preferred embodiment of the invention will be explained with reference to FIG. 3.

A fuel cutoff apparatus 32 according to the invention is provided at an upper portion of a fuel tank 31. The fuel cutoff apparatus 32 is of dual construction comprising an outer casing 33 and an inner float 34 disposed so as to be vertically movably therein. A plurality of openings through which fuel flows in are provided in a side face of the outer casing 33. Valve openings 36A, 36B are provided at a top portion of the outer casing 33. The outer casing 33 is secured to a mounting casing 37 which is, in turn, secured to the fuel tank 31. The mounting casing 37 is provided with a port 38 that communicates with a side of a canister (not shown). Valve bodies 39A, 39B that open and close the valve openings 36a, 36B are provided at a top portion of the inner float 34. The outer casing 33 and the inner float 34 are made of plastic.

The construction described heretofore is the same as that of the known fuel cutoff apparatus disclosed in the Japanese Patent Application Laid-Open Publication No. HEI 10-238429. Unique about the fuel cutoff apparatus according to the embodiment of the invention is that it has a construction to exhaust fuel that flows inside the outer casing 33 as detailed below.

Namely, a bottom surface of the outer casing 33 is closed by a plate 40. An exhaust port 41 for fuel is provided in the plate 40. There is also provided at a bottom of the inner float 34 a valve protrusion 42 that is fitted into the exhaust port 41 to close the exhaust port 41. The plate 40 is made of plastic.

There is installed a spring 43 between the inner float 34 and the plate 40. The spring 43 urges the inner float 34 upward, which helps make it easier for the valve protrusion 42 of the inner float 34 to open the exhaust port 41.

The operation of the embodiment of the invention constructed as detailed heretofore will be explained with reference to FIGS. 4A, 4B, and 4C and FIGS. 5A, 5B, and 5C.

Referring to FIG. 4A, during ordinary fuel filling, when a fuel level in the fuel tank is lower than the fuel cutoff apparatus, the valve protrusion 42 of the inner float 34 closes the exhaust port 41 in the plate 40.

Referring to FIG. 4B, when a bottom portion of the fuel cutoff apparatus is soaked in the fuel in the fuel tank and the fuel level in the fuel tank is lower than the openings 35, a fuel pressure acts on a bottom surface of the valve protrusion 42 of the inner float 34, exerting a force to float the inner float 34 upward. Since the weight of the inner float 34 is still heavier in this condition, however, the valve protrusion 42 continues closing the exhaust port 41 formed in the plate 40. When more fuel is then poured into the fuel tank, a large amount of fuel flows inside the outer casing 33 through the openings 35 provided therein. Then, the inner float 34 is raised by buoyancy, causing upper valve bodies not shown to close valve openings not shown. (For example, the valve bodies 39A, 39B close the valve openings 36A, 36B in FIG. 3.)

That is, the fuel which has flown inside the outer casing 33 raises the inner float 34, thus cutting off the fuel.

The operation when fuel directly flows in through a filler pipe and when the fuel level pulsates will next be explained.

Figure 5A:
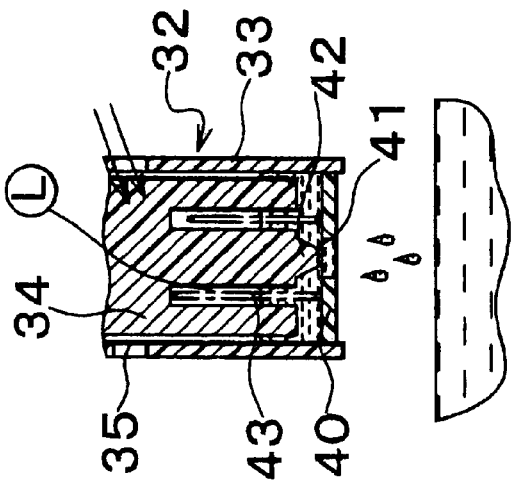
FIGS. 5A, 5B, and 5C are cross-sectional views for illustrating a condition in which fuel directly flows from a filler pipe into an outer casing.
Figure 5B:
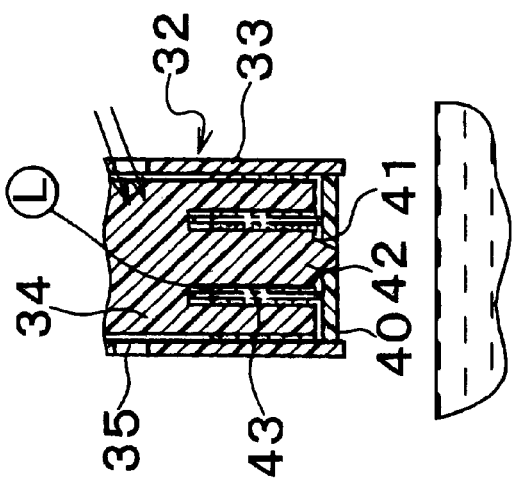
Figure 5C:
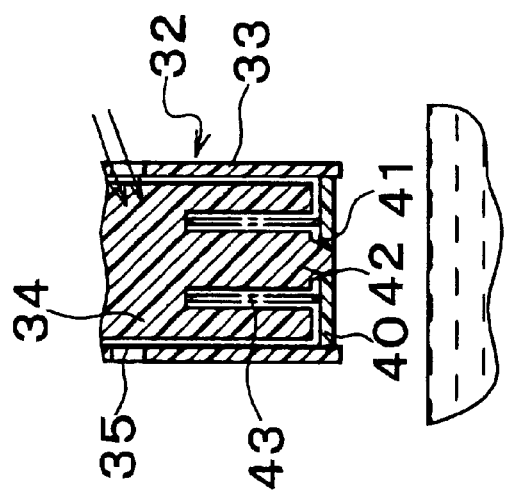

Fuel is supplied through the filler pipe and, referring to FIG. 5A, when fuel gradually flows inside the outer casing 33 through the openings 35 and is stored inside the outer casing 33 to a level L shown in FIG. 5B, the inner float 34 is raised by buoyancy as shown in FIG. 5c. When the inner float 34 goes up, however, the valve protrusion 42 opens the exhaust port 41, which allows the fuel stored inside the outer casing to be exhausted into the fuel tank, causing the inner float 34 to move immediately downward. This prevents the valve bodies provided upward the inner float 34 from closing the valve openings (for example, the valve bodies 39A, 39B from closing the valve openings 36A, 36B in FIG. 3). This prevents fuel from being cut off.

This operation applies also to a case, in which fuel pulsates. Namely, when the fuel level pulsates, fuel flows inside the outer casing 33 through the openings 35 in the outer casing 33 as shown in FIG. 5B. The inner float 34 is then raised by buoyancy, which results in the valve protrusion 42 opening the exhaust port 41 as shown in FIG. 5C. As a result, the fuel that has flown in is exhausted to the fuel tank 31. The fuel which has flown inside the outer casing 33 therefore causes the inner float 34 to go up, thus preventing the fuel cutoff apparatus from being actuated at early stages.

According to the embodiment of the invention explained in the foregoing discussion, the plate 40 is provided for the outer casing 33 and the exhaust port 41 for fuel is formed in the plate 40 and is opened and closed by the valve protrusion 42 provided in the inner float 34. The construction to open and close the exhaust port as embodied in the invention is not the only possible configuration.

Figure 6:
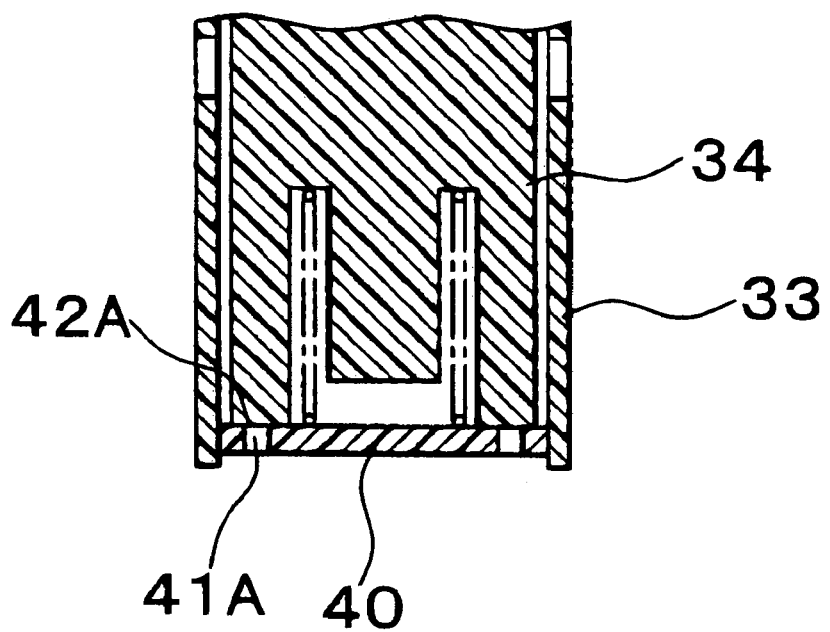
FIG. 6 is a cross-sectional view showing a fuel cutoff apparatus according to another preferred embodiment of the invention.

That is, referring to FIG. 6, an exhaust port 41A comprising a plurality of holes is formed in the plate 40 installed to the outer casing 33 and a bottom surface 42A formed by a flat surface of the inner float 34 is used as a member for opening and closing the exhaust port 41A.

Figure 7:
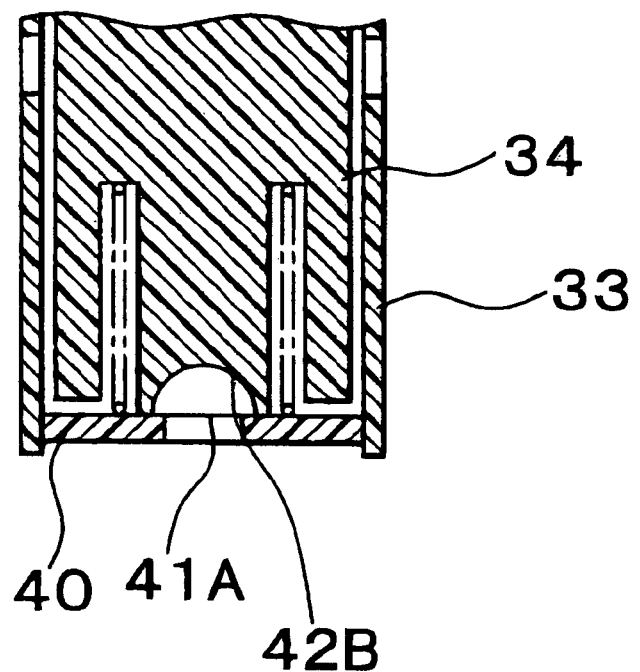
FIG. 7 is a cross-sectional view showing a fuel cutoff apparatus according to still another preferred embodiment of the invention.

According to the embodiment of the exhaust port shown in FIG. 7, an exhaust port 41A comprising a hole is formed in the plate 40 installed to the outer casing 33 and, as a member for opening and closing the exhaust port 41A, a recessed spot 42B is formed in a bottom surface of the inner float 34. The exhaust port 41A is located inside the recessed spot 42B so as to be opened and closed by the recessed spot.

Another embodiment of the invention, in which fuel poured in through the fuel filler pipe is prevented from flowing inside the outer casing directly through the openings, will be explained.

Figure 8:
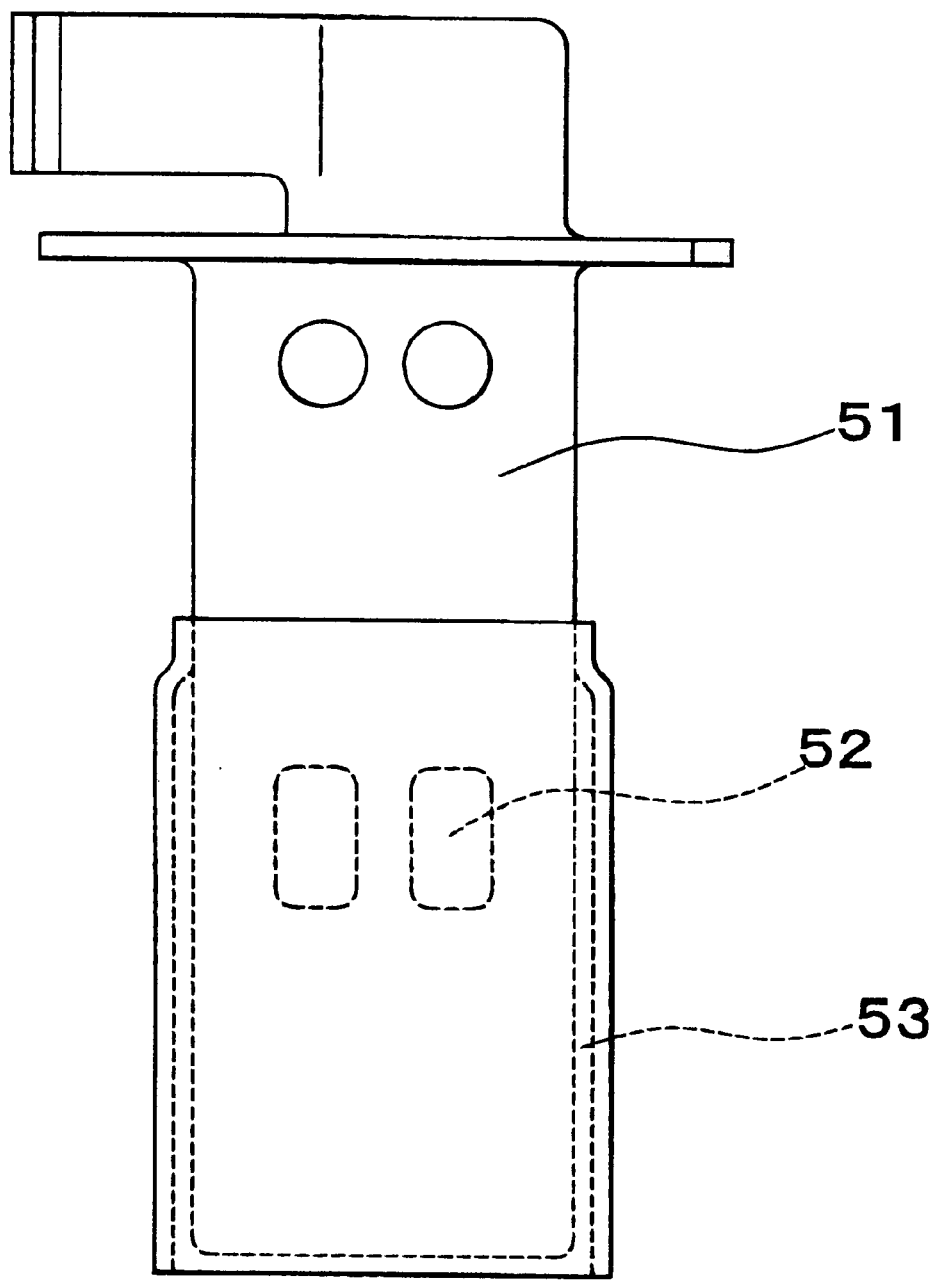
FIG. 8 is a front elevational view showing a cover according to one embodiment of the invention.

Referring to FIG. 8, a cover 53 is installed to cover openings 52 formed in a side face of an outer casing 51. A sufficient clearance is provided between the cover 53 and an outer peripheral surface of the outer casing 51. When the fuel level in the fuel tank becomes high, therefore, it does not happen that fuel in the fuel tank is prevented from flowing through the clearance and by way of the openings 52 into the inside of the outer casing.

According to this embodiment, since the cover 53 covers the openings 52, fuel flown from the filler pipe does not directly flow into the inside of the outer casing 51 through the openings 52.

Figure 9:
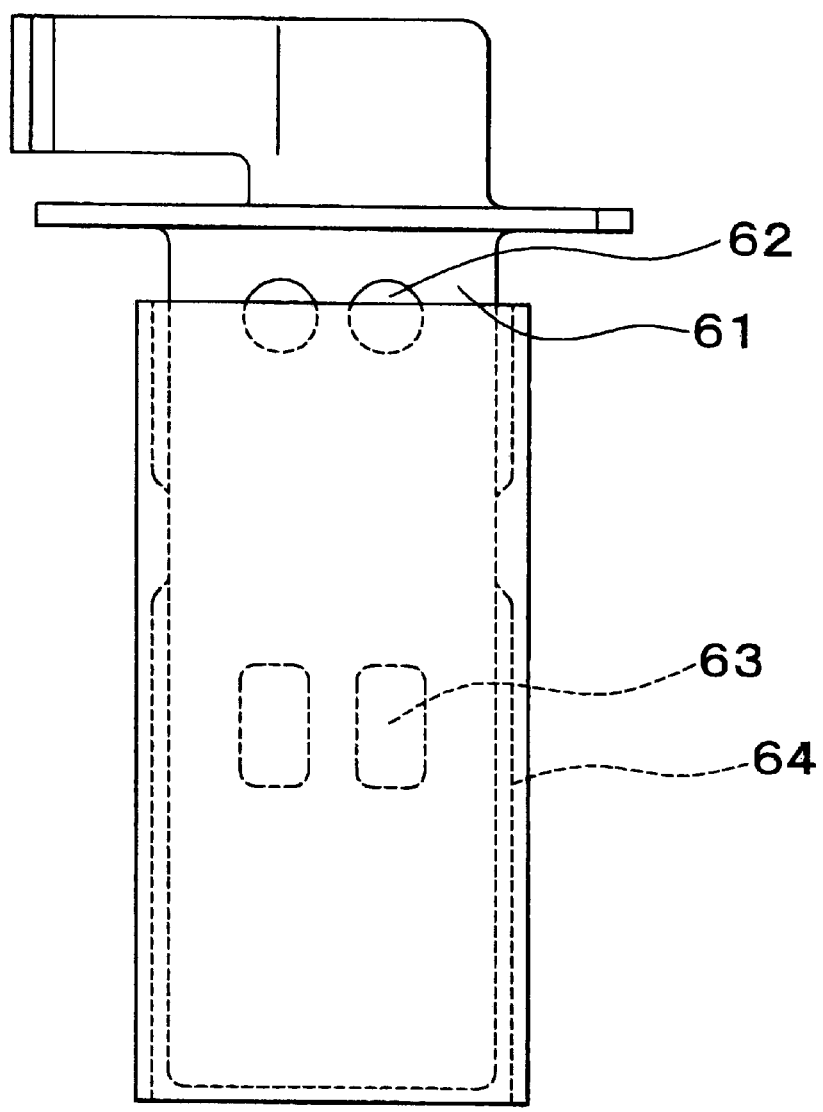
FIG. 9 is a front elevational view showing a cover according to another embodiment of the invention.

The embodiment of the invention shown in FIG. 9 will next be explained. Referring to FIG. 9, the fuel cutoff apparatus has a construction, in which upper holes 62 are drilled in an upper portion of an outer casing 61. The upper holes 62 reduce resistance in an exhaust path of fuel vapor, facilitating exhaust of the fuel vapor. In the embodiment shown in FIG. 9, there is provided a cover 64 that covers both openings 63 in the outer casing 61 and the upper holes 62.

The embodiment shown in FIG. 9 as described in the foregoing discussion prevents fuel poured through the filler pipe from directly flowing into the inside of the outer casing through the upper holes. This is not, however, be effective enough to completely block the inflow of fuel through the upper holes. Namely, an impetus of the fuel poured through the filler pipe generates an upward flow of fuel, thus causing the fuel to flow into the inside of the outer casing through the upper holes.

A structure is therefore provided that, as the fuel poured through the filler pipe makes contact with the outer casing or the cover, hurls the fuel back by changing a moving direction thereof according to still another embodiment of the invention to be explained in the following.

Figure 10:
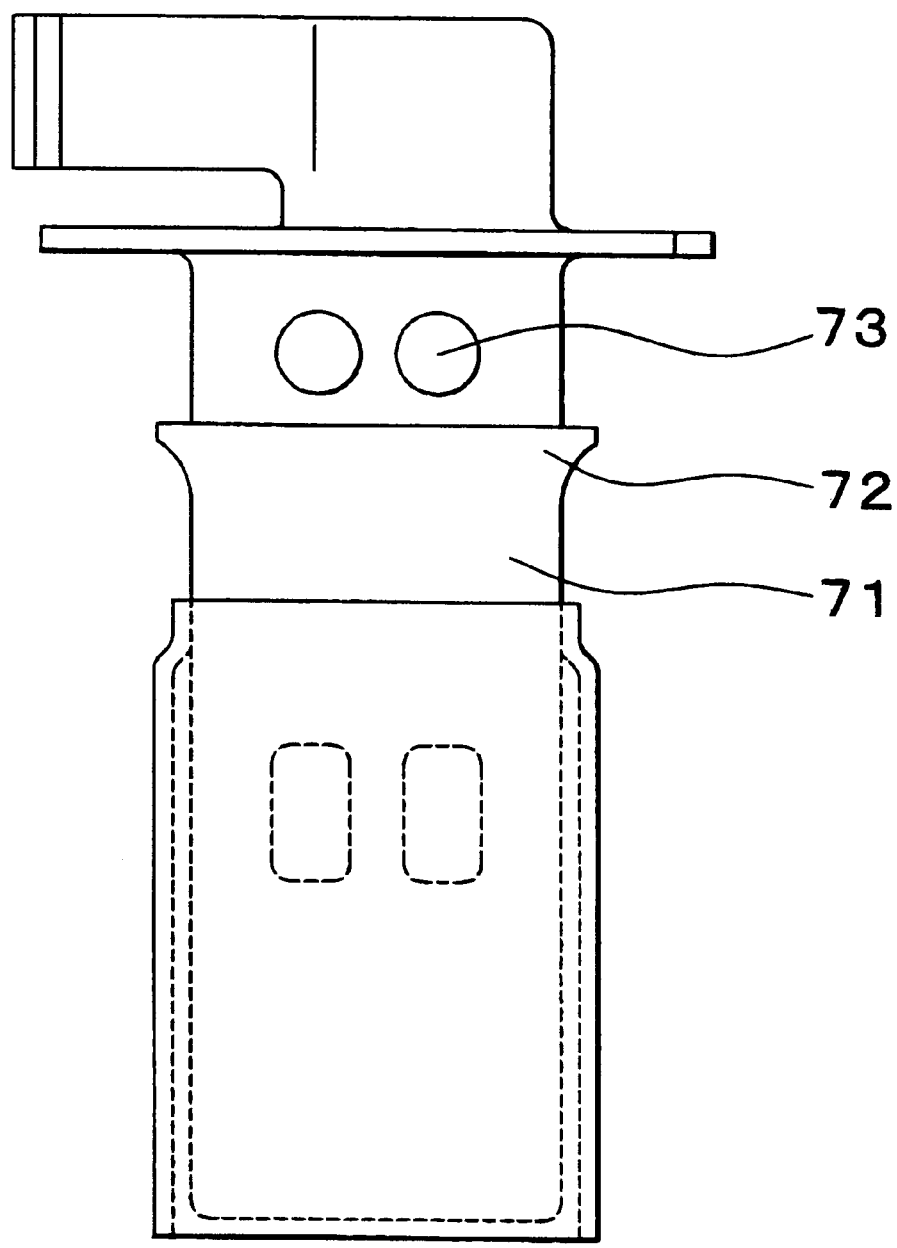
FIG. 10 is a front elevational view showing a structure for reversing a fuel flow according to the invention.

According to the embodiment shown in FIG. 10, a slope surface 72 is formed at a top end of an outer casing 71 by enlarging a diameter of the outer casing. The slope surface 72 reverses a direction of flow of fuel, thus preventing the fuel from flowing into the inside of the outer casing 71 through upper holes 73.

The shape of the top end portion of the outer casing 71 is not limited to the slope surface facing slantwise downward. It is effective as long as an end with a large diameter than a main body of the cover is formed at the top end of the outer casing so that the flow of fuel can be reversed as the fuel level goes up.

Figure 11:
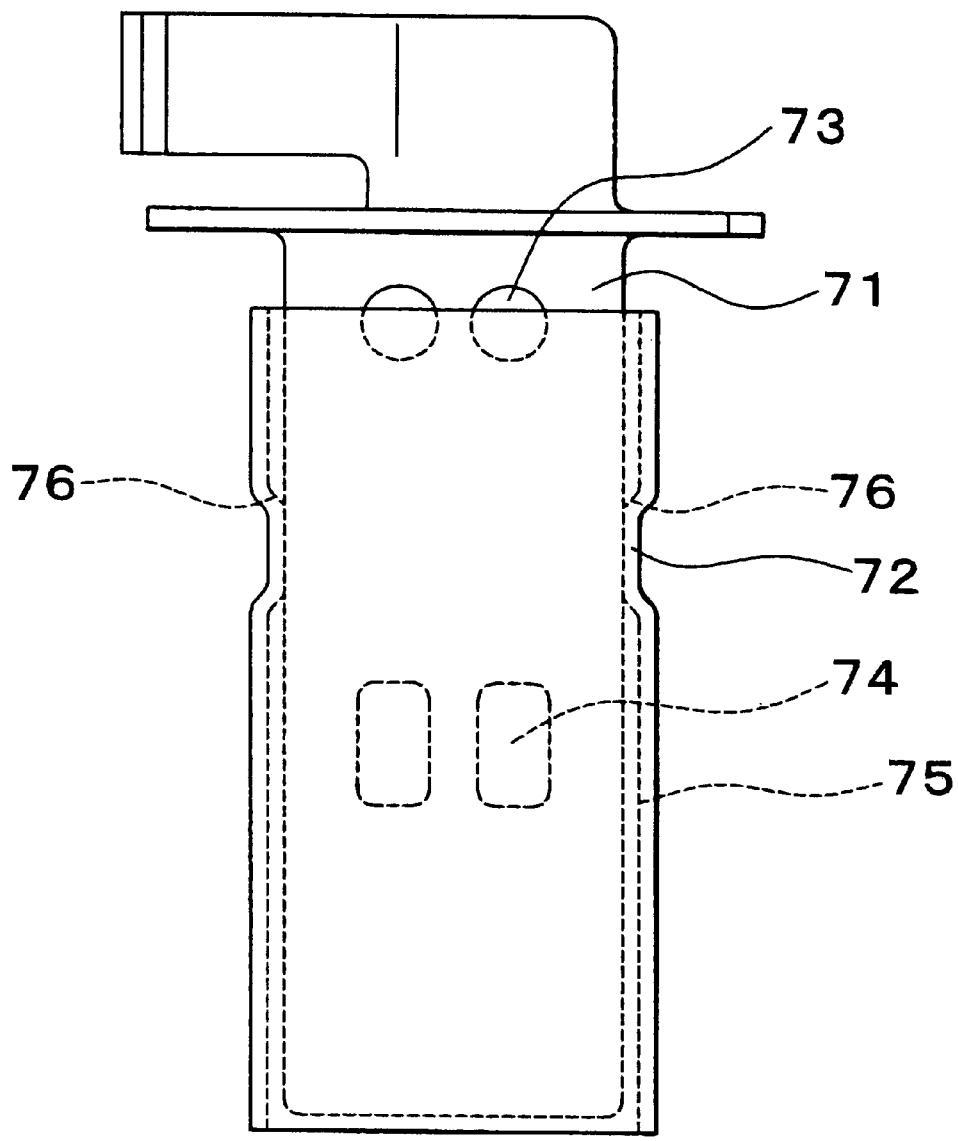
FIG. 11 is a front elevational view showing another structure for reversing a fuel flow according to the invention.

According to the embodiment shown in FIG. 11, a cover 75 that covers both openings 74 and upper holes 73 is provided for the outer casing 71. A slope surface 72 with a narrower diameter is formed at generally a center position between the upper holes 73 and the openings 74 of the cover 75. The slope surface 72 reverses the flow of fuel upward and downward, thereby preventing the fuel from flowing into the inside of the outer casing 71 through the upper holes 73. A plurality of communication ports 76 formed in the slope surface 72 serve as an exhaust port for that part of fuel that flows to an upper position of the cover 75.

Figure 12:
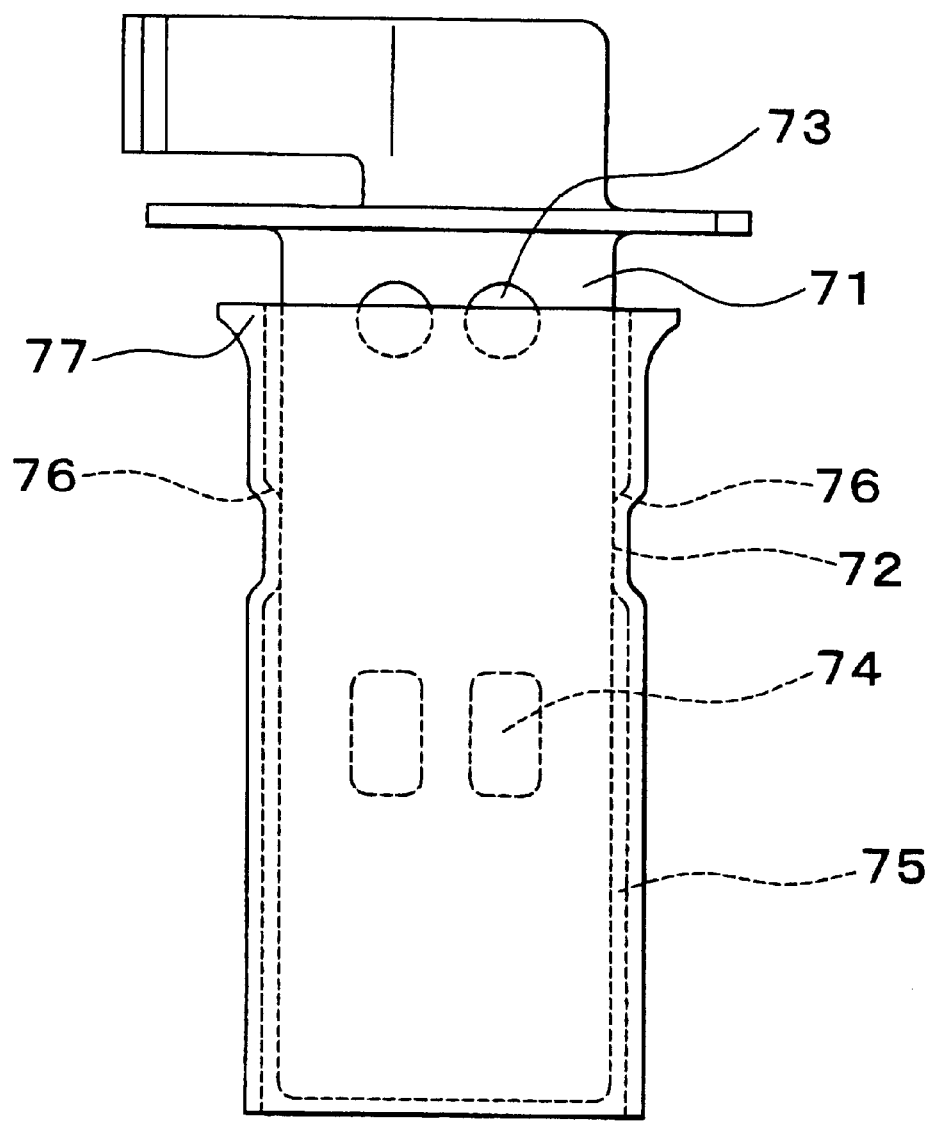
FIG. 12 is a front elevational view showing still another structure for reversing a fuel flow according to the invention.

The embodiment shown in FIG. 12 is an improved version of the embodiment shown in FIG. 11. There is provided for the outer casing 71 the cover 75 that covers both the openings 74 and the upper holes 73. The slope surface 72 comprising a recess with a narrower diameter is formed at generally a center position of the cover 75. In addition, there is formed at a top end portion of the cover a slope surface 77 formed so as to open outwardly. The slope surface 77 reverses the direction of flow of fuel to prevent the fuel from flowing into the inside of the outer casing 71 through the upper holes 73. The plurality of communication ports 76 formed in the slope surface 72 serve as an exhaust port for that part of fuel that flows into the inside of the cover 75.

Figure 13:
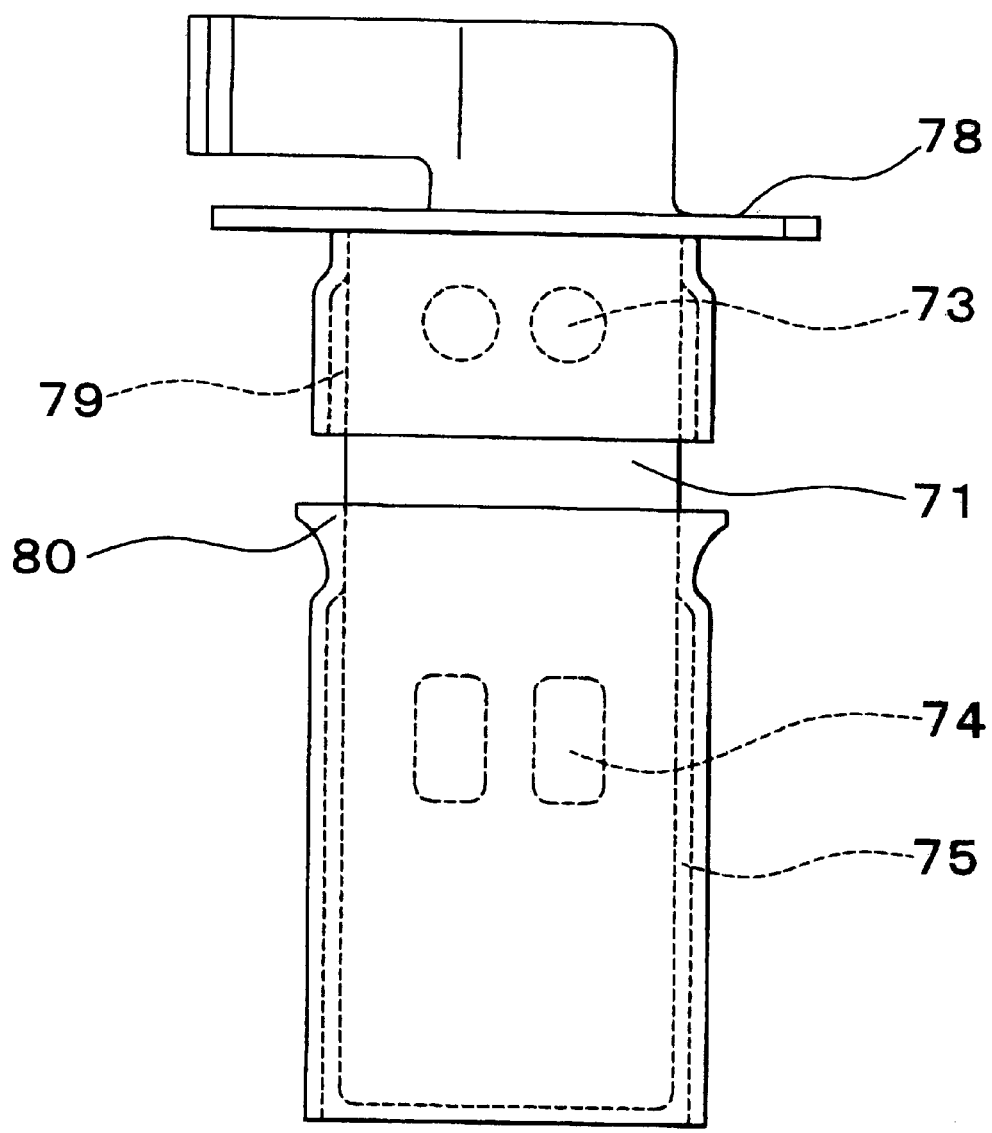
FIG. 13 is a front elevational view showing a structure of a cover according to another embodiment of the invention.

According to the embodiment shown in FIG. 13, the upper holes 73 formed in the outer casing 71 is covered by a cover 79 that droops downward in a shape of a skirt from a mounting casing 78 and there is provided for the outer casing 71 the cover that covers the openings 74. A slope surface 80 that is open outwardly is formed at a top end of the cover 75. The slope surface 80 reverses the direction of flow of fuel to prevent the fuel from flowing into the inside of the outer casing 71 through the upper holes 73.

In each of these above-mentioned embodiments, the cover is attached to the outer casing, which makes it necessary to secure the cover and increases the number of parts used.

Figure 14:
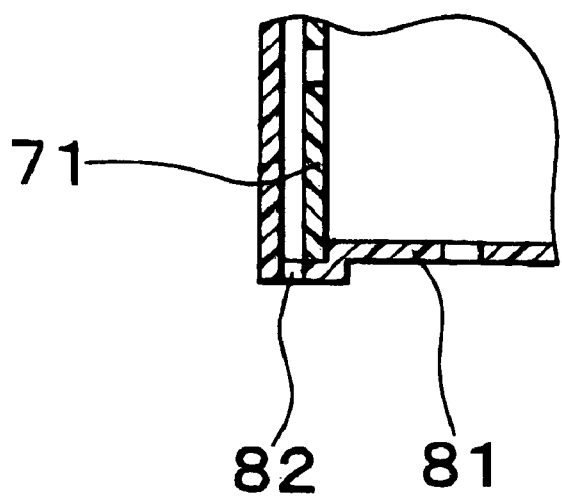
FIG. 14 is a cross-sectional view showing a structure that integrates a cover and a plate according to one embodiment of the invention.

In the embodiment shown in FIG. 14, a plate 81 provided at a bottom end of the outer casing 71 is integrated with the cover, which facilitates fixing of the cover and reduces the number of parts used. In this case, a communication port 82 provided at the bottom end of the cover serves as an exhaust port for fuel.

Figure 15:
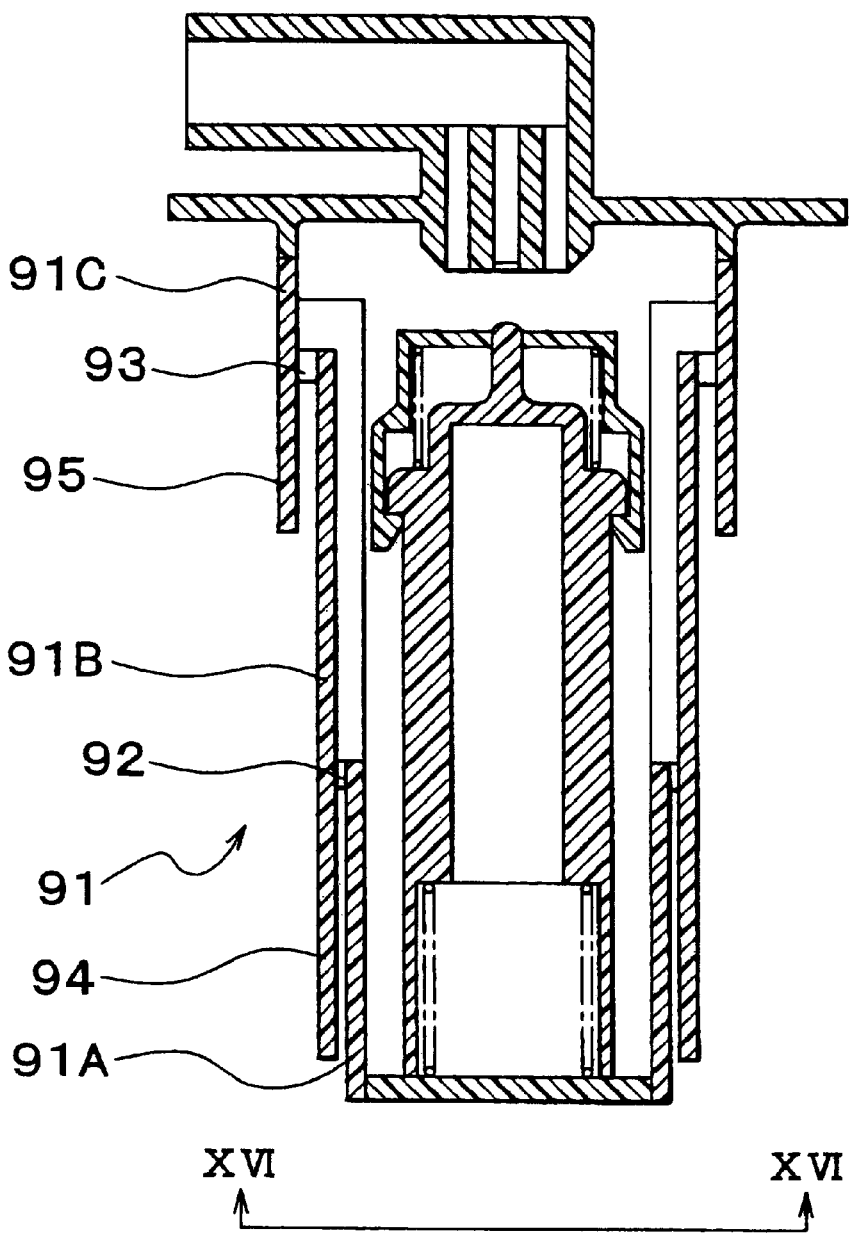
FIG. 15 is a cross-sectional view showing a structure that integrates a cover and an outer casing according to one embodiment of the invention.
Figure 16:
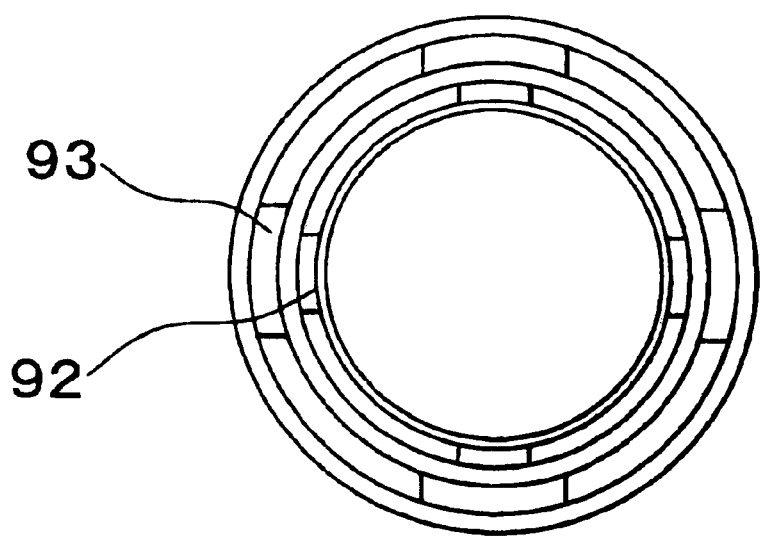
FIG. 16 is a view taken along the line XVI—XVI of FIG. 15.

According to the preferred forms of embodiments explained in the foregoing discussion, the outer casing is separate from the cover. An embodiment as explained in the following may nonetheless be possible. Namely, referring to FIG. 15, an outer casing 91 is of a multiple diameter structure comprising sections of varying diameters 91A, 91B, 91C that are enlarged as they are placed more toward the top. There are provided at a portion at which the diameter is enlarged an opening 92 comprising a vertical hole and an upper hole 93. The construction of the portion at which the diameter is enlarged may be horizontal, as shown in FIG. 15, or taper. The position of the opening 92 is lower than the position of the upper hole 93. Cylindrical covers 94, 95 are provided so as to cover the opening 92 and the upper hole 93. According to the embodiment, the covers 94, 95 are integrated with the outer casing 91; however, they may be separate from each other. It is preferable that the upper hole 93 be shaped in a slot as shown in Fig. to minimize flow resistance, while the shape of the opening 92 is not necessarily limited.

Furthermore, it is not definitely required that both of the two cylindrical covers provided for the outer casing to cover the opening 92 and the upper hole 93 be installed. Rather, either one of them should be sufficient to serve the purpose.

According to the above-mentioned embodiment, the number of parts used is small, it is easy to assemble parts, and a low cost can be achieved.

Moreover, a smaller amount of fuel flows in the vertical hole than in a horizontal hole, which means that a greater effect of preventing premature actuation of the fuel cutoff apparatus can be derived from the embodiment.

In the preferred embodiments explained in the foregoing discussion, the construction of two-stage opening and closing of the valve openings 36A, 36B by the valve bodies 39A, 39B is not mandatory and may be modified as necessary according to actual applications. The invention is characterized in that it prevents the fuel cutoff apparatus from being actuated at early stages and it allows a greater amount of fuel to be poured into the fuel tank, in addition to which a variety of effects can be derived.

What is claimed is:

1. A fuel cutoff apparatus comprising:
   an outer casing including a plurality of side openings in a side face thereof, a valve opening at a top portion thereof and a bottom opening at a bottom portion thereof;
   a plate provided so as to close the bottom opening of the outer casing, the plate being provided with an exhaust port for exhausting fuel; and,
   an inner float disposed inside the outer casing so as to be vertically movable therein, the inner float being provided with a valve body at a top portion thereof to open and close the valve opening and a closing portion at a bottom portion thereof to close the exhaust port.

2. The apparatus according to claim 1 wherein:
   the closing portion includes a valve protrusion that is provided at a bottom portion of the inner float and to be fitted in the exhaust port.

3. The apparatus according to claim 1 further comprising:
   a spring provided between the inner float and the plate and urges the inner float upward.

4. The apparatus according to claim 1 further comprising:
   a cover that covers the side openings in the outer casing.

5. The apparatus according to claim 4 wherein:
   the cover and the plate are integrated with each other.

6. The fuel cutoff apparatus of claim 1, wherein the outer casing includes an upper hole provided in the side face of the outer casing at a position above the plurality of side openings, comprising:
   a cover that covers the upper hole in the outer casing and the side openings in the outer casing.

7. The fuel cutoff apparatus of claim 1, wherein the outer casing includes an upper hole provided in the side face of the outer casing at a position above the plurality of side openings, comprising:
   a first cover shaped like a skirt that covers the upper hole in the outer casing; and,
   a second cover that covers the side openings in the outer casing.

8. A fuel cutoff apparatus comprising:
   an outer casing including a plurality of side openings provided in a side face of the outer casing, an upper hole provided in the side face of the outer casing at a position above the plurality of side openings, and a valve opening provided at a top portion of the outer casing;
   an inner float disposed inside the outer casing so as to be vertically movable therein, the inner float being provided with a valve body at a top portion thereof to open and close the valve opening; and,
   a cover that covers the side openings in the outer casing, the cover being provided with an end having a diameter larger than the diameter of a main body of the cover at a position lower than the upper hole provided in the outer casing.

9. The apparatus according to claim 8 wherein:
the end is formed so that a top end of the cover opens outwardly and provided with a slope surface that faces downward.

10. A fuel cutoff apparatus comprising:
an outer casing including a plurality of side openings provided in a side face of the outer casing, an upper hole provided in the side face of the outer casing at a position above the plurality of side openings, and a valve opening provided at a top portion of the outer casing;
an inner float disposed inside the outer casing so as to be vertically movable therein, the inner float being provided with a valve body at a top portion thereof to open and close the valve opening; and,
a cover that covers the upper hole in the outer casing and the side openings in the outer casing, wherein the cover is provided with a slope surface formed by narrowing a diameter at a position of the outer casing between the upper hole and the side openings.

11. A fuel cutoff apparatus comprising:
an outer casing including a plurality of side openings provided in a side face of the outer casing, an upper hole provided in the side face of the outer casing at a position above the plurality of side openings, and a valve opening provided at a top portion of the outer casing;
an inner float disposed inside the outer casing so as to be vertically movable therein, the inner float being provided with a valve body at a top portion thereof to open and close the valve opening; and,
a cover that covers the upper hole in the outer casing and the side openings in the outer casing, wherein the cover is provided with an end at a top end thereof that has a diameter larger than a main body of the cover.

12. The apparatus according to claim 11 wherein:
the end is formed so that the top end of the cover opens outwardly and provided with a slope surface that faces downward.

13. A fuel cutoff apparatus comprising:
an outer casing including a plurality of side openings provided in a side face of the outer casing, an upper hole provided in the side face of the outer casing at a position above the plurality of side openings, and a valve opening provided at a top portion of the outer casing;
an inner float disposed inside the outer casing so as to be vertically movable therein, the inner float being provided with a valve body at a top portion thereof to open and close the valve opening;
a first cover shaped like a skirt that covers the upper hole in the outer casing; and,
a second cover that covers the side openings in the outer casing, wherein the second cover is provided at a top end thereof with a portion having a diameter larger than a main body of the second cover.

14. A fuel cutoff apparatus located in a fuel tank comprising:
an outer casing of a multiple diameter construction having different diameters, the outer casing including an opening comprising a vertical hole located below a top surface of the fuel tank at a portion with an enlarging diameter and a valve opening at a top portion thereof;
an inner float disposed inside the outer casing so as to be vertically movable therein, the inner float being provided with a valve body at a top portion thereof to open and close the valve opening; and
a cover of a cylindrical shape that covers the opening.

15. The apparatus according to claim 14, wherein the outer casing and the cover are integrated with each other.

16. A fuel cutoff apparatus comprising:
an outer casing of a multiple diameter construction having different diameters, the outer casing including an opening comprising a vertical hole at a portion with an enlarging diameter and a valve opening at a top portion thereof;
an inner float disposed inside the outer casing so as to be vertically movable therein, the inner float being provided with a valve body at a top portion thereof to open and close the valve opening; and
a cover of a cylindrical shape that covers the opening, wherein the outer casing is provided with an upper hole comprising a vertical hole at a portion with an enlarging diameter located above the portion with the enlarging diameter provided with the opening.

17. The apparatus according to claim 16, wherein the cover covers the upper hole.

18. The apparatus according to claim 17 wherein:
the outer casing and the cover are integrated with each other.

* * * * *